United States Patent [19]
Yoshida et al.

[11] Patent Number: 5,335,315
[45] Date of Patent: Aug. 2, 1994

[54] METHOD FOR DETERMINING A GRAPHIC AREA RATIO OF A PRINTING PLATE AND AN APPARATUS THEREFOR

[75] Inventors: Masakichi Yoshida; Kenjiro Ikehata; Masashi Sugimura, all of Tokyo, Japan

[73] Assignee: Toppan Printing Co., Ltd., Tokyo, Japan

[21] Appl. No.: 757,909

[22] Filed: Sep. 11, 1991

[30] Foreign Application Priority Data

Sep. 17, 1990 [JP] Japan .................................. 2-246490
Nov. 29, 1990 [JP] Japan .................................. 2-332784
Nov. 29, 1990 [JP] Japan .................................. 2-332785

[51] Int. Cl.$^5$ .......................... G06F 15/62; G06F 3/00
[52] U.S. Cl. .................................... 395/109; 395/117; 101/453
[58] Field of Search ............... 101/DIG. 45, DIG. 46, 101/211, 483, 453; 395/101, 109, 117, 139

[56] References Cited

U.S. PATENT DOCUMENTS

| | | | |
|---|---|---|---|
| 4,233,663 | 11/1980 | Sugawara et al. | 364/515 |
| 4,240,119 | 12/1980 | Norton et al. | |
| 4,520,454 | 5/1985 | Dufour et al. | 364/900 |
| 4,573,798 | 3/1986 | Fujie et al. | 356/432 |
| 4,649,500 | 3/1987 | Yamada et al. | 364/518 |
| 4,763,359 | 9/1988 | Tsunoda et al. | |
| 5,128,879 | 7/1992 | Greve et al. | 364/526 |

FOREIGN PATENT DOCUMENTS

| | | |
|---|---|---|
| 3527500 | 4/1986 | Fed. Rep. of Germany. |
| 89/07525 | 8/1992 | Fed. Rep. of Germany. |
| 2160055A | 12/1985 | United Kingdom. |
| 2189744A | 11/1987 | United Kingdom. |

OTHER PUBLICATIONS

"Pre-Press Picture Processing in the Graphic Arts Industry," P. Pugsley, IEEE Transactions on Communications, vol. Com-29, No. 12, Dec. 1981, pp. 1891-1896.

*Primary Examiner*—Robert L. Richardson
*Attorney, Agent, or Firm*—Staas & Halsey

[57] ABSTRACT

A computer type setting device (CTI) performs layout of letters and graphic information of a manuscript on printing plates, based on the data transmitted from a keyboard. During such an operation, plate layout data LD such as the font, size, word spacing and line spacing, are determined. Raster image processor (RIP) converts this plate data PD into digitized bitmaps/characters BD, and inputs the results into a layout scanner. The layout scanner converts the digitized pictorial and figure data into 8-bit contrast image data IM, per page of the manuscript, and determines the layout of the images and the contrast data on the printing plates. The dot generator 13 scans the finished plates data PD in a given direction, digitizes the images in terms of [0]s and [1]s into film exposure data ED, and supplies the results to an output scanner and a memory device. The output scanner optically produces positive film nettings, based on the successive film exposure data ED. The exposure data ED is read out at certain intervals by a control device, and is supplied to a plate area ratio accumulating device 16, which computes area ratios SD, according to input from an external source FLD and according to the ink key spacing of the press, to provide a signal to efficiently and effectively control the amount of ink to be supplied to the printing plates so as to permit a high quality printing operation.

12 Claims, 11 Drawing Sheets

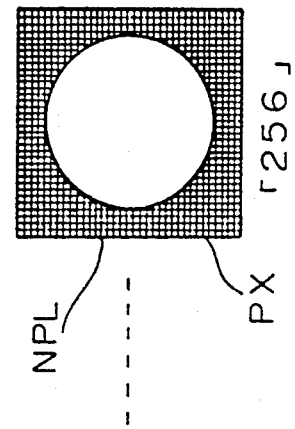
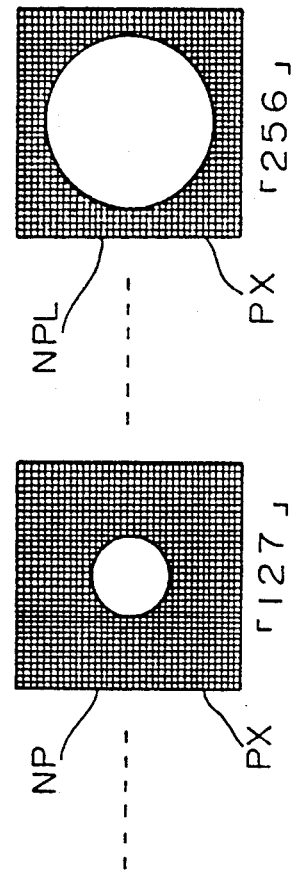
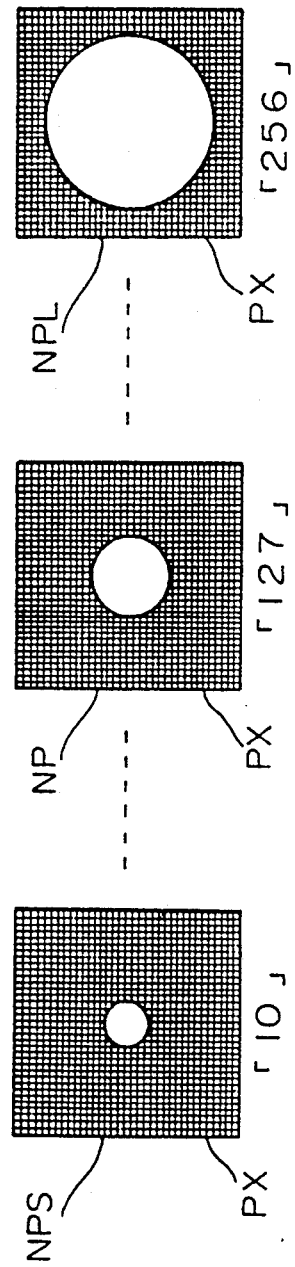
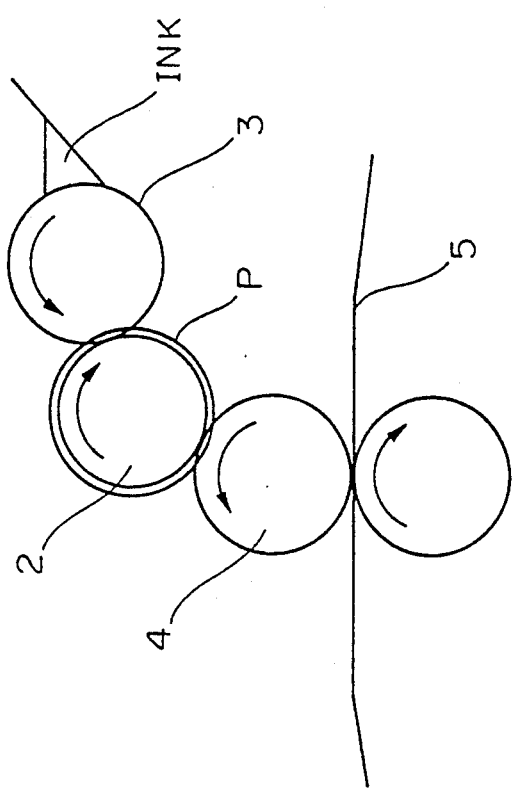

METHOD FOR DETERMINING A GRAPHIC AREA RATIO OF A PRINTING PLATE AND AN APPARATUS THEREFOR

BACKGROUND OF THE INVENTION

1. Field of the Invention

This invention relates to a method for computing the graphic area ratio of picture images on printing plates effectively and efficiently, and an apparatus for performing such a task.

2. Background Art

Printing plates are classified into three broad types depending on the techniques used in preparing the printing plates: relief surface type, intaglio or depressed surface type and planographic type. The present invention is concerned with the planographic type. This type of printing plates is best suited for color printing or large area printing work, and the printing plates are made of aluminum. These plates are coated with a photo-sensitive emulsion sensitive to a particular wave length (UV, ultra violet), and such plates are called PS (presensitized) plates.

In coloring printing, the usual practice is to prepare four plates P consisting of colors Y (yellow), M (magenta), C (cyanogen) and BK (black) for one sided printing and eight plates for two sided printing. There are cases in which several pages are arranged on one plate, and depending on the number of printed pages involved, many printing plates are required.

On the printing plates P are photographically exposed picture patterns by means of netting positive films, which contain all the necessary information to be printed, such as the picture images, lines and letters. All emulsions except such printing information are removed, and the remaining information emulsions are protected by hardening of the emulsion by such means as burning (developing) and by coating.

In the meantime, the printing ink for the printing plates is supplied through ink keys which are placed at a fixed distance on the printing machine. The plates are divided into sections of a given width (for example, 30 mm) along the printing direction, each section corresponding with an ink key. The amount of ink to be supplied to each section is controlled by the picture patterns to be printed. The area occupied by various patterns is controlled by the relative areas of the pattern to be printed. The larger the area occupied by a certain pattern, the greater the amount of ink which must be supplied to print that pattern. On the other hand, when the area of the pattern is small, the amount of ink required to print that pattern must also be kept correspondingly small.

Accordingly in such a printing process, it is necessary to control the amount of printing ink depending on the relative pattern ratio of a particular graphic element within the overall graphic pattern. If there is a supply mismatch, there will be fading in the region of insufficient supply and smearing in the region of oversupply.

It has been the practice to measure the relative area in each of the ink keys, after the completion of the development stage. The value of this relative area is obtained according to the difference in the relative reflectivities between the regions with and without the emulsion. The measurement method utilizes the characteristics of the developed plates to reflect more light from the regions stripped of emulsion compared with the emulsion coated region. Reflectance measurements are made with a laser beam, which scans the surface of the plate P, and the intensity of the reflected beam is measured by a light meter. The varying intensities of the reflected beams from the surface indicates whether the reflection is from a patterned region or not, and enable determination of the area ratios of various regions to correspond with the respective ink keys.

We now explain the process of affixing the printing plates to printing roller bodies and the printing process with reference to FIG. 16. The measured plate P is wound and affixed on a roller body 2. The surface is then flooded with water supplied from a water transfer roller (not shown). Of the two types of materials on the plate surface, the aluminum surface is hydrophilic while the emulsion is lipophilic. Therefore, water wets the exposed aluminum regions and not the patterned regions coated with the emulsion. Next, printing ink is supplied to the plate surface through the inking roller 3, which transfers ink onto those regions of the plate which are coated with the emulsion but not to those regions of exposed aluminum wet with water. The ink patterns are transferred onto an elastic rubber blanket 4, from which the ink is transferred onto the surface of a printing object 5, such as paper, and the printing process is completed. This process is repeated for all the printing plates.

The area ratio computing apparatus is used with a plate held in the roller body, and therefore the apparatus has to be a correspondingly large apparatus, requiring a large working space. It is also equipped with a laser scanning mechanism and other mechanical moving parts, and is susceptible to breakdown problems associated with the hardwares. The use of emulsions to treat the surface often leads to problems of non-uniform surface quality, which leads to further problems of scatter in the reflectance method of measuring the surface area. The differences in the surface quality (coloring, flatness and different surface treatments), caused by differing lots and processing, necessitates the resetting of parameters for every measurement. When the surface quality is variable within a plate, the reflectance for a pattern is not uniform, and causes inaccuracies in the area integration results. The ideograms and lines and other fine details require high resolution and are difficult to measure by the conventional techniques. Furthermore, printing usually requires a large number of plates P, and the unavoidable problems of manual setting of the plates and area measurements not only require a large expenditure of time and manpower, but also cause the associated problems of accidents and breakage due to manual handling. The overall result is a serious loss in printing efficiency.

SUMMARY OF THE INVENTION

The present invention was made to solve the above mentioned problems caused by the conventional method and apparatus of area measurement, by presenting a new method for area measurement and an area ratio computing apparatus which does not require a large space, is free from hardware problems, and produces accurate results irrespective of the differences in the printing plate surface quality, thereby producing an efficient area computation operation.

Therefore, the present invention presents a method for calculating the area ratio of the graphic area of a print, comprising the steps of performing a first layout of a proof page based on character data and graphic data, performing a second layout of the character and graphic data on the basis of a printing plate, converting the plate based data into a binary bitmap and counting the binary bit data according to specific regional divisions.

That is, the method of computing the picture area ratio is to perform a layout of a proof page based on character data and graphic data, to perform a layout of the character and graphic data on the basis of a printing plate, convert the plate-based data into a binary bitmap; and count the binary bit data according to specific regional divisions.

Further, the present invention presents an area computing apparatus which comprises first layout means for arranging character data and graphic data on the basis of a proof page, a second layout means for arranging the character and graphic data on the basis of a printing plate, data conversion means for converting the plate based data into a binary bitmap, counting means for counting the binary bit data according to specified regional divisions and computing means for computing the total relative area of graphic data from the regionally divided counting data.

In addition, the present invention provides a method for computing the area ratio of the graphic region for each region comprising the steps of: performing a first layout operation of character data and graphic data on the basis of a proof page, performing a second layout operation of arranging the character and graphic data on the basis of a printing plate, digitizing the resulting page layout into a binary bitmap form, which is subdivided into certain block regions, and computing the area ratios of the graphic data on the basis of the binary data counts made within each regional block to compute the area ratio of the graphic data.

Further, the present invention presents an area ratio computing apparatus comprising counting means for counting exposure related binary data for regionally divided blocks, said counting means having digitized graphic information which is used to print graphic data directly on printing plates and computing means for computing the plate area ratios of graphic areas based on the output information from the counting means divided into regional blocks.

That is, the procedure for computing the area ratio for graphic area comprises the steps of converting the pictorial information into exposure related binary data, exposing the graphics directly on printing plates by using the digitized graphic information, counting the binary data divided into regional blocks; and computing the area ratios of graphic area, for each divided block, based on the output information from the results of the counting step.

Thus, according to the present invention new methods for area measurement are presented which do not require a large space, are free from hardware problems, and produce accurate results irrespective of the differences in the surface quality, thereby producing an efficient area computation operation.

Further, the present invention presents yet another method for calculating an area ratio of graphic area of a print, comprising the steps of performing a first layout of a proof page based on character data and graphic data, performing a second layout of the character and graphic data on the basis of a printing plate, converting the plate based data into a binary bitmap and counting the binary bit data according to a regional area division whose width is not more than that of an ink key of the printing press.

That is, the method of computing the picture area ratio is to perform a layout of a proof page based on character data and graphic data, to perform a layout of the character and graphic data on the basis of a printing plate, convert the plate-based data into a binary bitmap and count the binary bit data according to a division whose width is not more than that of an ink key of the printing press.

Further, an area computing apparatus of the present invention comprises first layout means for arranging character data and graphic data on the basis of a proof page, a second layout means for arranging the character and graphic data on the basis of a printing plate, data conversion means for converting the plate based data into a binary bitmap, counting means for counting said binary bit data according to a division whose width is not more than the width of an ink key of a printing press and computing means for computing the area of graphic data relative to a standard width of the ink keys.

Therefore, the method for computing the area ratio of the graphic region for each region comprises the steps of performing a first layout operation of character data and graphic data on the basis of a proof page performing a second layout operation of arranging the character and graphic data on the basis of a printing plate digitizing the resulting page layout into a binary bitmap form, which is subdivided into certain block regions, and computing the area ratio of the graphic data on the basis of the binary data counts made within an ink key block, whose width is not more than that of the printing press, to compute the area ratio of the graphic data.

Further, the present invention presents an area ratio computing apparatus comprising counting means for counting exposure related binary data for a division whose width is not more than that of an ink key of the printing press, said counting means having digitized graphic information which is used to print graphic directly on printing plates and computing means for computing the area ratios of graphic areas based on the output information from said counting means.

That is, the procedure for computing area ratios for graphic areas comprises the steps of converting the pictorial information into exposure related binary data, exposing graphic directly on printing plates by using the digitized graphic information, counting the binary data divided into regional blocks whose widths are not more than the width of the printing press and computing the area ratios of graphic area, for each divided block, based on the output information from the results of the counting step.

Thus, according to the present invention, new methods for area measurement are presented which do not require a large space, are free from hardware problems, and produce accurate results irrespective of the differences in the surface quality, thereby producing an efficient area computation operation. Further, the area ratios based on standard widths are independent of the roller width of a particular printing press, thus leading to an advantage that the proposed area ratio computing method can be used commonly by any printing press which utilizes the ink key based divisions.

Further, the present invention presents a new method for area ratio computation, which computes plate-based area ratios for graphic area of a printing plate, the method comprising the steps of performing a first layout operation of character data and graphic data on the basis of a proof page, including a step of obtaining the area ratio of character data consisting of a particular font, from a first memory means which stores area information of a variety of font formats and computing the area ratios for graphic data for each plate obtained from the information in a second memory means which stores area information based on picture image nettings (shortened to image nettings herein below) having predetermined area data, together with the value of the area ratio computed from the image nettings data.

That is, the procedure for computing the area ratios for graphic areas comprises the steps of performing a first layout operation of character data and graphic data on the basis of proof page storing the proof page information in a first memory means, comparing the proof page data with a predetermined font and image data stored in a second memory means; and computing the area ratios of plate-based graphic data for specified regional divisions from the results of said comparison.

Further, the present invention presents an area ratio computation apparatus comprising a first layout means for arranging character data and graphic data on the basis of a proof page, including a step of obtaining the area ratio of character data consisting of a particular font, from a first memory means which stores area information of a variety of font formats and computing means for obtaining the area ratios for graphic data for each plate obtained from the information in a second memory means which stores area information based on image nettings having predetermined area data, together with the value of the area ratio computed from the image nettings data.

That is, the procedure for computing the area ratios for graphic areas comprises the steps of performing a first layout operation of character data and graphic data on the basis of proof page, performing a second layout operation to arrange the page data in terms of a plate-based data, obtaining the character area ratio data from a first memory means, comparing the proof page data with a predetermined font and image data stored in a second memory means and computing the cumulative area ratios of proof page based character data and graphic data into plate-based character and graphic data according to specified regional divisions.

Thus, further new methods for area measurement are presented which do not require a large space, are free from hardware problems, and produce accurate results irrespective of the differences in the surface quality, thereby producing an efficient area computation operation.

BRIEF DESCRIPTION OF THE DRAWINGS

FIGS. 15 (a), 15 (b) and 15 (c) illustrate the concept of image nettings for defining the graphic area ratio.

FIG. 16 is a schematic of a printing press.

PREFERRED EMBODIMENTS OF THE PRESENT INVENTION

Preferred embodiments are explained below with reference to the figures.

First Preferred Embodiment

Figure 1:
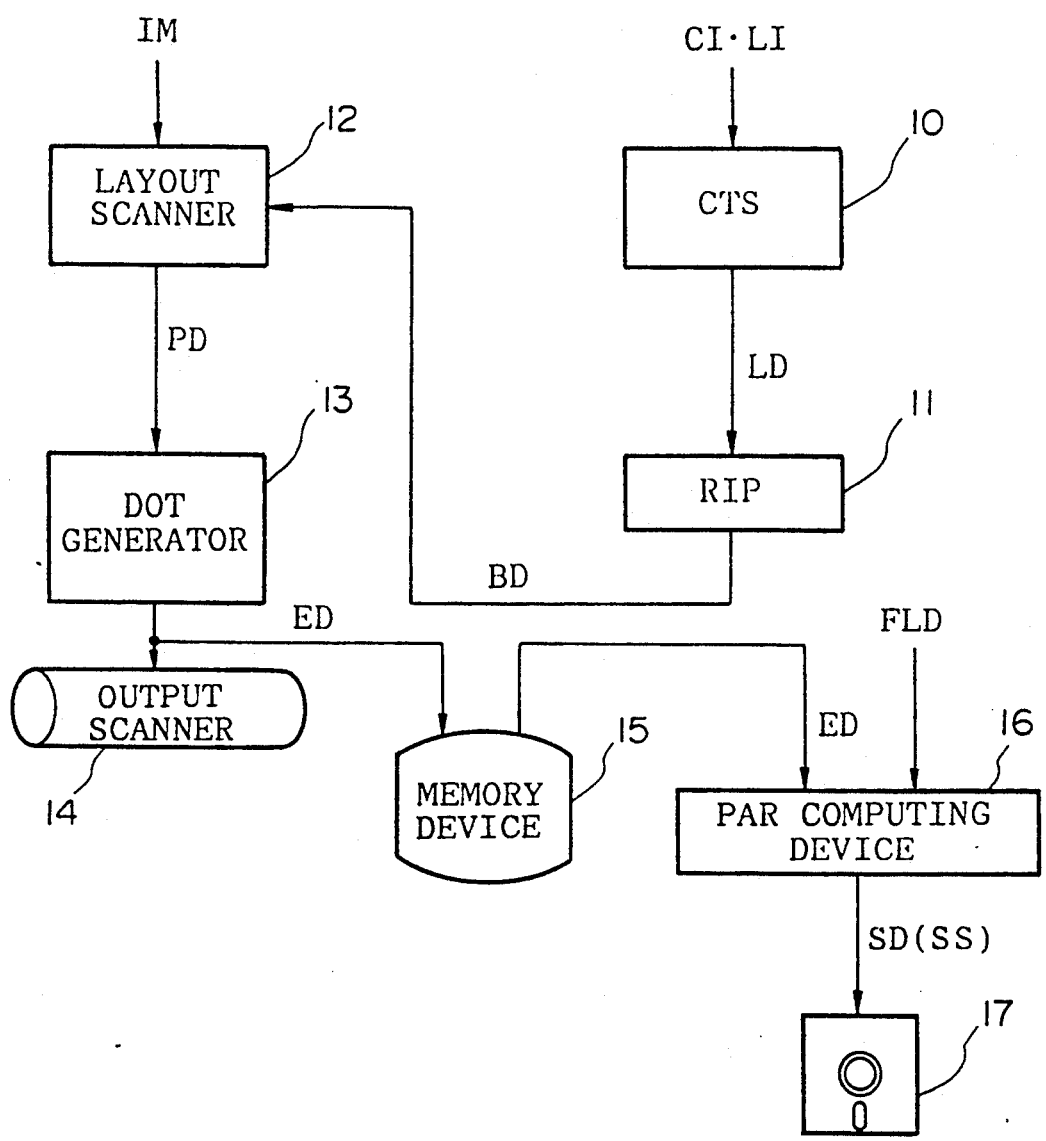
FIG. 1 is a block diagram of a first preferred embodiment.

FIG. 1 is a block diagram of the first preferred embodiment. A computer type setting (CTS) 10 operates a layout of character data CI and lines data LI, which are entered from a keyboard inputting device, on the basis of the manuscript. In this operation, type face, font size, character and line spacings are set as layout data LD. The layout data LD is supplied to raster image processor (RIP) 11. RIP 11 converts the plate data LD into bitmap/character data BD, consisting of [0] and [1], and forwards the digitized data to a layout scanner 12. Layout scanner 12 performs a step of scanning a manuscript page and converting the photographic and figure images IM into 8-bit digital data (henceforth referred to as graphic data) as well as a step of laying out the placement of graphic data and bitmap/character data BD on a plate. This information, containing a mixed set of character and graphic data, is forwarded as finished plate data PD to a dot generator 13. The dot generator 13 scans the PD information in a given direction, to produce film exposure data ED consisting of [0] and [1] and outputs this film exposure data ED to an output scanner 14 and memory device 15. The output scanner 14 formulates a series of positive nettings films optically based on the successive incoming film exposure data ED. The positive nettings films are used in making printing plates as in the conventional technology.

In the memory device 15 are stored the film exposure data ED, which are read out periodically by a control facility (not shown) from the memory device 15 and are entered into a plate area ratio (PAR) computing device 16. The PAR computing device 16 computes the area ratio data SD to be printed based on the information contained in the exposure data ED in accordance with an external supplied plates data FLD (explained below) containing information on ink key division spacing and the layout on the relevant printing plate P.

Figure 2:
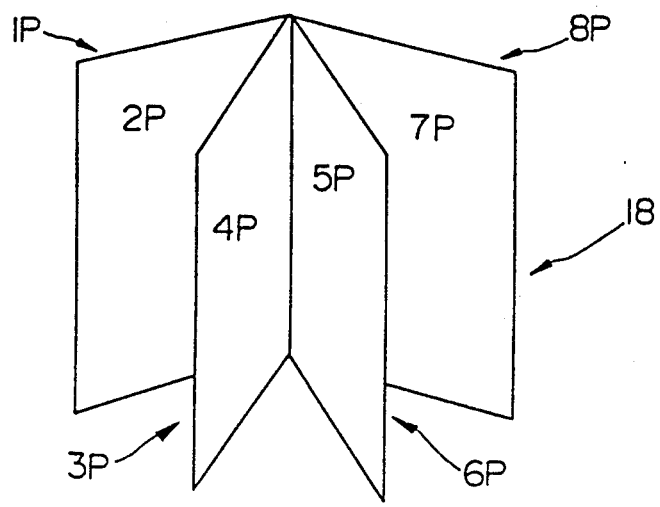
FIG. 2 is a schematic illustration of steps involved the preparation of printed pages.
Figure 3A:
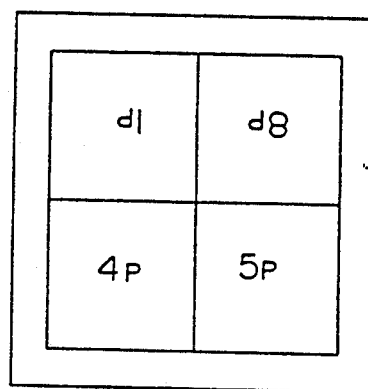
FIGS. 3 (a) and 3 (b) are illustrations of an example of a film layout arrangement on a printing plate.
Figure 3B:
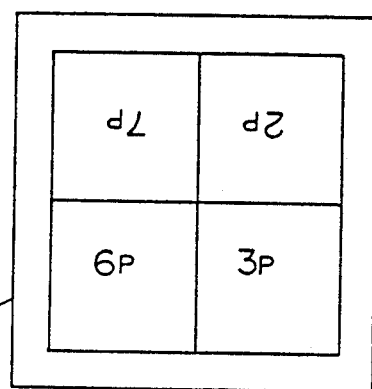
Figure 4:
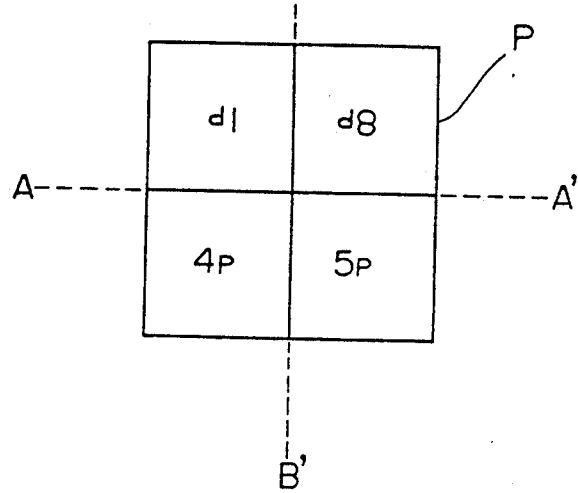
FIG. 4 is an example of the folding of printed matter.

The plates data FLD are explained in the following. The FLD data contain the dimension of printing plate P and layout information. For example, in a case of making an eighteen page manuscript 18 illustrated in FIG. 2, the positive films to correspond with proof pages are laid out as shown in FIGS. 3 (a) and 3 (b). FIG. 3 (a) shows the plate layout for one side of a page (say, a front page) for the printing plate P, and FIG. 3 (b) is the same for the opposite page (i.e., the back page). The layout information mentioned above contains instructions regarding the film exposure position and direction, the dimension of the printing plate P, ink key spacings and the number of ink keys. The printed matter made according to such a plate P is first folded into a peak along the line A-A', and into a valley B-B' as shown in FIG. 4, and subsequently made into a finished book shown in FIG. 2. Summarized, film layout is performed in accordance with such considerations as the folding steps, page numbers, picture layout and the characteristics of a printing press.

Figure 5:
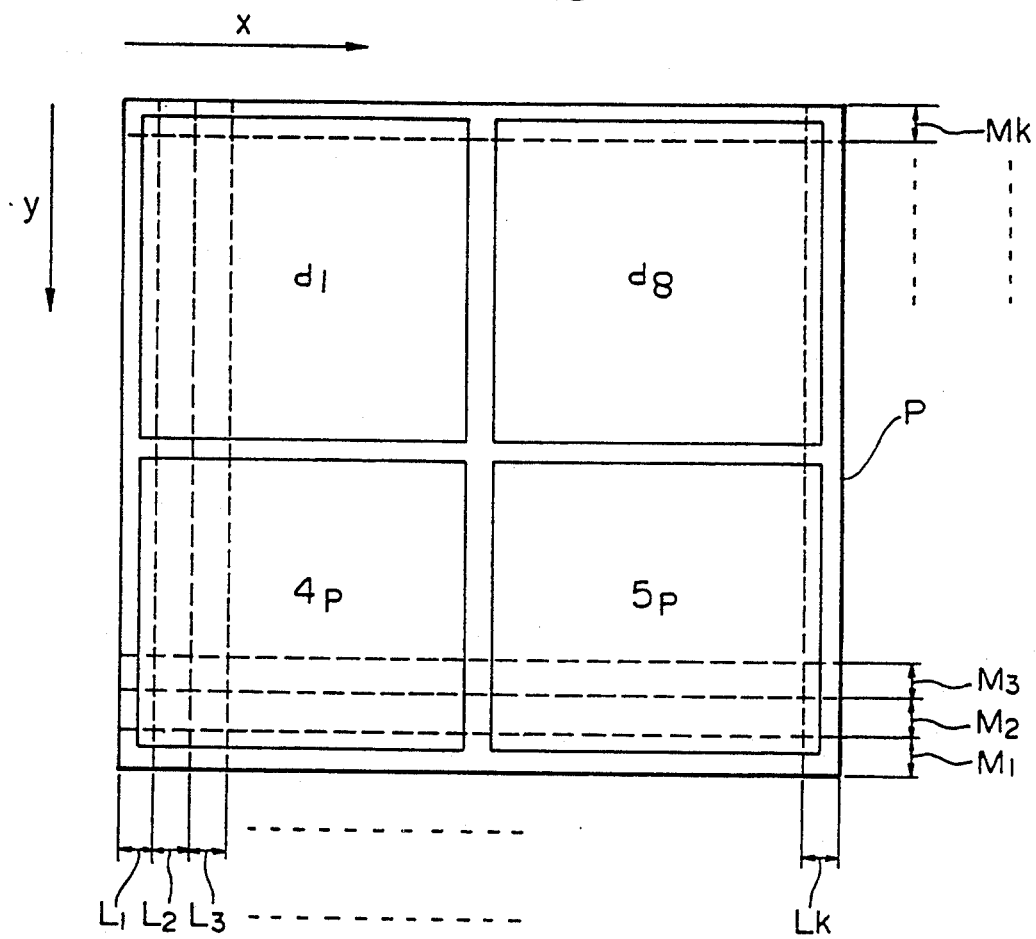
FIG. 5 is an illustration for explaining the concept of ink keys and the steps of a film layout on a printing plate.
Figure 6:
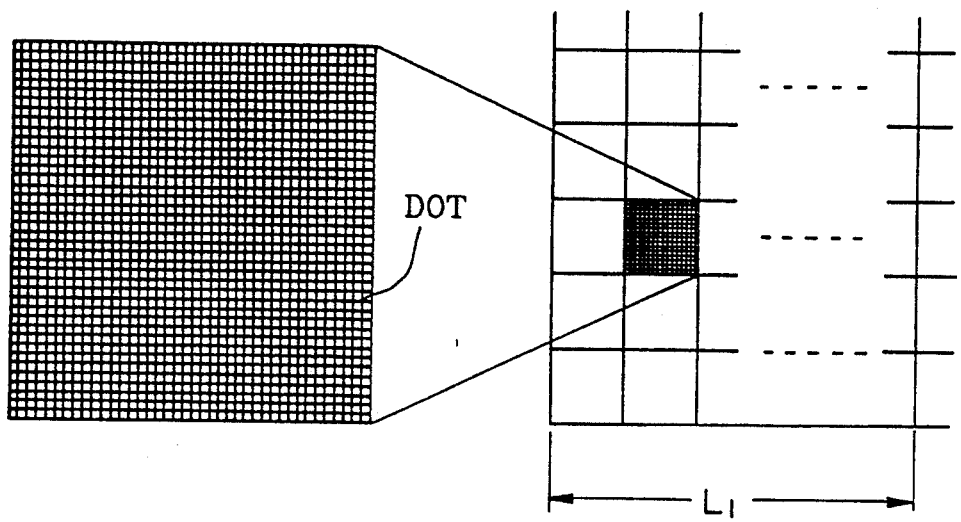
FIG. 6 is a schematic illustration of a step of exposing font data on a printing plate.

The procedure for obtaining the area ratio Sr will be explained next. The PAR computing device 16 performs the steps of entering into the memory an entire film layout of the plate P, according to plates data FLD and film exposure data ED as shown in FIG. 5. In this figure, the rectangle shown by the solid line represents the entire outline of the plate P, and L1, L2 . . . Lk correspond with the ink key regional divisions where k is the number of inks. Each region, shown in FIG. 6, is composed of dots in which the on-dots represent the line/picture regions and off-dots represent the non-picture regions.

On the plate P, dot nettings are constructed according to the input information from film exposure data ED. In the example shown in FIG. 5, the Y represents the printing direction.

The PAR computing device 16 counts on-off dots as [0] dots and [1] dots for each region, L1, L2 . . . Lk. For example, if Na1 represents the total number of [0] and Nb1 the total number of [1] in region L1, the area ratio in region L1, Sr1, is obtained by computing a quantity $\{Nb1/(Na1+Nb1)\} \times 100$. By repeating this computation step for each of the regions L2, L3 . . . Lk, the area ratios for the regions Sr2, Sr3 . . . Srk are obtained. A general formula for the area ratio is:

$$Sri = \{Nbi/(Nai+Nbi)\} \times 100 \quad (1)$$

where i is an integer, 1, 2, 3 . . . k.

Next, the computed values of the area ratio Sri are stored in memory medium 17 such as a floppy disk or magnetic cards, as area ratio data SD of a given quantity. The memory medium 17 is installed into a data reading device (not shown). The data reading device reads area ratio data SD recorded in memory medium 17, and controls the amount of supply of printing ink to the printing press. The area ratio data SD can also be supplied to the printing press directly through an on-line connection.

Next, the operation of the PAR computing device 16 will be explained.

The first step is to load into CTS 10 character and graphic information, CI and LI to perform printing plates layout. The CST 10 outputs layout data LD to RIP 11, which converts the layout data LD into bitmap/character data BD and forwards the digitized data to a layout scanner 12. Layout scanner 12 scans a manuscript page and converts the photographic and figure images IM into 8-bit digital data, and arranges the placement of graphic data and bitmap/character data BD on a printing plate. This information is forwarded through a dot generator 13 and is supplied to the output scanner 14 and to the memory device 15 as film exposure data ED consisting of [0]s and [1]s. The output scanner 14 formulates a series of positive nettings films based on the successive incoming film exposure data ED. The nettings positive films are installed manually as illustrated in FIGS. 3 (a) and (b), for example. The plate layout information such as the nettings film exposure position and direction on the plate P, the dimension of the printing plate P, ink key spacings and the number of ink keys (i.e., the FLD information), is entered into the PAR computing device 16 through inputting means, such as a keyboard. In the memory unit of the PAR device, this information is laid out, as shown in FIG. 5, to show the entire film layout on the plate P. Within each ink key division, the total numbers of [0] and [1] are counted, and the area ratios for the regions L1 to Lk are obtained according to the formula shown in (1). The area ratio data SD are recorded in memory medium 17, from which data the printing press adjusts the amount of ink to be supplied. This process assures the supply of correct volumes of various inks to the printing press in accordance with the relative proportions of various pictorial elements.

The above described process is repeated for all the SD for the printing plates P required to produce a printed document.

Second Preferred Embodiment

This embodiment concerns direct exposing of characters and images on the printing plate P, in contrast to the previous embodiment in which a positive film is first produced.

Figure 7:
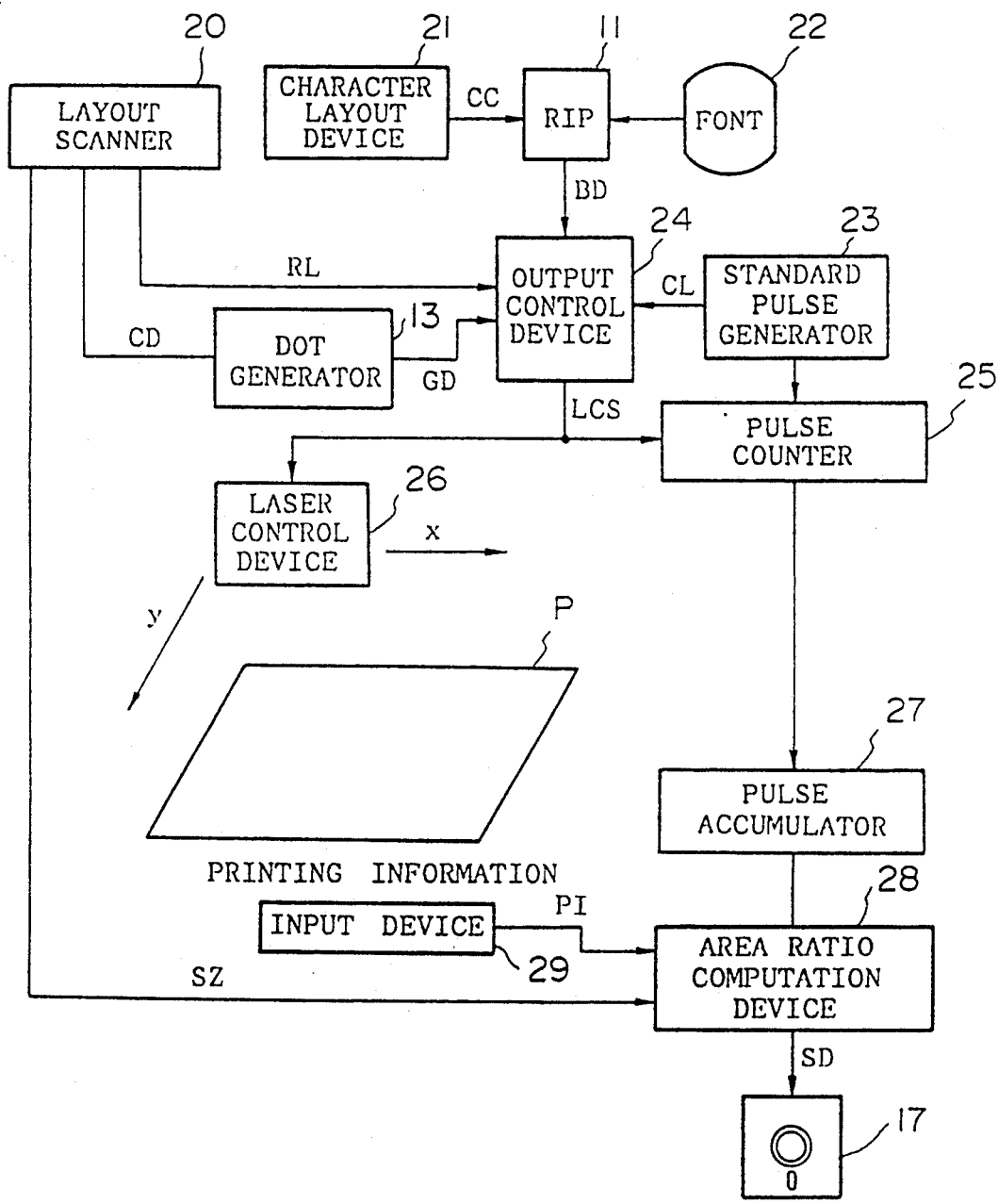
FIG. 7 is a block diagram of a second preferred embodiment.

FIG. 7 is a block diagram of the second embodiment. A layout scanner 20, in contrast to the previous embodiment, performs all the character/lines layout for at least one plate P. This layout scanner 20 outputs eight-bit contrast data CD (graphic data), lines data RL and plates data SZ to each of dot generator 13, output control device 24 and area ratio output means 28. The dot generator 13, while scanning in a given direction, converts the contrast data CD into graphic data GD, consisting of [0]s and [1]s, and forwards the data to the output control device 24.

A character layout device 21 corresponds to CTS 10 of the first preferred embodiment. This device performs the steps of plate layout for character data entered through keyboards, and forwards the layout of the character code CC to RIP 11, which converts the character code CC, according to font formats, into bitmap/character data BD consisting of [0]s and [1]s, and outputs the resulting digital data to output control device 24.

A standard pulse generator 23 generates standard pulses CL of a given interval, and enters the signal into an output control device 24 and a pulse counter 25.

Next, when any one of the character data BD, the line data RL and the graphic data GD is in operation, then the output control device 24 outputs high level (or ON state) laser control signals LCS, in synchronization with the standard pulse CL, to both of the pulse counter 25 and to the laser control device 26. The laser control device 26 scans the object in the y-direction, as shown in FIG. 5, and when a line scan is completed, the scan position is shifted by one pixel in the x-direction and repeats a scan in the y-direction. Repeated cycles of the process as described above produce a graphic pattern on a printing plate P. The printing direction can either be the x- or y-direction.

The pulse counter 25 counts the standard pulses CL and the laser pulses (high level) to obtain cumulative counts for each line, and forwards the results to a pulse accumulator 27. That is, for each line of a plate P, the number counts of ON-pixels and of the standard pulses CL are recorded. Pulse count accumulator 27 sums the counts of the ON-pixels, and enters the results into the area ratio computation device 28. The area ratio computation device 28 holds printing information PI, such as the size SZ of a printing plate P, the printing direction and the spacing of the ink key. The printing information PI is inputted by an input device 29 such as keyboard. It should be noted that this printing information PI can be pre-stored in a memory device and recalled as necessary. Next, the area ratio computation device 28 calculates the area ratio Sr for each ink key spacing according to the relevant printing information PI and the computation flow chart which will be described later. The area ratios data SD for the ink key is recorded in a memory medium 17 such as a floppy disk or magnetic card. The ink key area ratios data SD can also be supplied directly by on-line access to the printing press, as in the first preferred embodiment.

The processing steps can be summarized as follows. The first step is to load the line and graphic data into the layout scanner 20 to perform layout on the plate P. The line data RL is supplied to the output control device 24 while the contrast data CD is converted into graphical data GD, in accordance with the number of ON-dots to express contrast shading, by the dot generator 13, and the results are entered into the output control device 24.

On the other hand, the character data is entered into the character plate layout device 21 for their layout on the plate P, and the characters so arranged are converted into ON-OFF data in accordance with the font 22 of the font data, by the RIP 11. The digitized character data BD are supplied to the output control device 24.

Next, the laser control signals LCS, formulated according to the graphic data GD, line data RL and character data BD, are supplied to laser control device 26, by the output control device 24 in synchronization with the standard pulse signals generated by the pulse signal generator 23. The laser control device 26 generates signals and scans the plate so that when the laser control signal LCS is [1] the beam in ON, and when the LCS is [0] the beam in OFF. By this process, the images, lines and character are developed on the plate P in accordance with the plate layout instructions.

At the same time, the output control device 24 outputs the laser control signal LCS to the pulse counter 25 in parallel with the developing operation on the plate P as described above. The pulse counter 25 counts the pulses of the laser control signal LCS, and enters the results into the pulse count accumulator 27. The pulse count accumulator 27 sums the ON-pixels for each ink key spacing, and the results are forwarded to the area ratio computation device 28. The area ratio computation device 28 calculates the area ratios of the graphical and character data for every ink key spacing according to the flow chart shown in FIG. 8. The program steps are explained below.

In the first step SA1, the program examines whether the directions of printing and exposure are coincident. If the result in step SA1 is [YES], that is the printing direction is the y-direction, then it proceeds to step SA2, in which the ink key spacing is entered into a parameter $l_1$. In step SA3, the dimension of the x-direction is entered in a parameter X, and the dimension of the y-direction in a parameter Y. In step SA4, the resolution capability in the x-direction, i.e., the number of pixels per unit length, is entered in the parameter Xr, and the corresponding figure in the y-direction in the parameter Yr. It then proceeds to step SA5, in which it initializes a parameter i to [1]. In step SA6, it determines the regional exposure frequency i, i.e., the number of ON-pixels within a width, L1 in this case, of the ink key, and enters this value in a parameter "n_on-i". It then proceeds to step SA7, in which an area ratio is calculated on the basis of the following formula;

$$Sli = (n\_on\text{-}i)/\{(Y \times Yr) \times (l1 \times Xr)\} \qquad (2)$$

where the denominator represents the total number of pixels existing within an area defined by the width L1, and as a result the parameter Sli (i=1) yields the value of the area ratio within an area of width L1.

In step SA8, the parameter i is incremented, making it [2], in this case. It proceeds to step SA9, where it is determined whether the parameter i has reached its end point k of the ink key division or not. If the result in step SA9 is [NO], it returns to step SA5, and while maintaining the parameter i as [2], and repeats the steps SA6, SA7, SA8 AND SA9. By these steps, the parameter of the area ratio Sli (1:2) pertaining to the area defined by L2 is obtained.

The above steps SA6 to SA8 are repeated until the result in step SA9 becomes [YES]. By this process, the area ratios Sl1, Sl2 . . . Slk corresponding to each ink key division are obtained, and when the step SA9 becomes [YES], i.e., all the area ratios have been obtained, then this subroutine is terminated.

If the result in step SA1 is [NO], that is when there is a mismatch in the printing direction and the exposure direction, the program jumps to step SA10. In step SA10, the value of the ink key spacing is entered into a parameter $l_2$. In step SA11, the dimension of the plate P in the printing direction x is entered into the parameter X, and the corresponding figure for direction y is entered in the parameter Y. In step SA12, the values of the resolution in the x- and y-directions are entered in the corresponding parameters Xr and Yr, as presented earlier for the case of a y-direction printing. It proceeds to step SA13, in which i is initialized to [1]. In step SA14, a parameter m is initialized to [1], and in step SA15, the regional exposure frequency for the "m"th line in the M1 region is entered in the parameter "n_on-i". In step SA16, the value of n_on-i is added to a parameter n_all (1) and the result is stored in the parameter n_all (1). In step SA17, the parameter m 1s incremented to [2], and it proceeds to step SA18. In step SA18, it examines whether the parameter m has exceeded a value, [X to Xr], defined by the total number of lines in the x-direction of the plate P in a given division of m. That is, in step SA18, the program examines whether the accumulated exposure frequency count has been completed within a regional division of M1 (see FIG. 5). When the result in step SA18 is [NO], the computation has not been completed, the program path returns at step SA15. It maintains m to [2], and repeats the steps SA15, SA16 AND SA17. In this case, the parameter n_on-2 is added to the parameter n all(1) which contains the value of "n_on-1".

The above steps, SA15 to SA18 are repeated until the step SA18 results become [YES]. As a result, the value of the parameter n all(1) is obtained, i.e. the number of ON-pixels within the region M1. When the path in step SA18 becomes [YES], i.e. the area ratio has been obtained, it proceeds to step SA19. In step SA19, the parameter i in incremented to [2], and in step SA20, it is determined whether the parameter i has exceeded "k" (which is the number of ink keys). If the path is [NO] in step SA20, the path returns to step SA14, and the steps SA14 to SA20 are repeated. Since the parameter i is set to [2], the loop SA15-SA18 yields a value of the exposure frequency inside the region M2 (FIG. 5), which (FIG. 5) is stored in n_all(2). The above steps are repeated by incrementing i, until the path in step SA20 becomes [YES]. As a result, the values of the exposure frequency are produced and stored in the parameters, n_all(1), n_all(2) and n_all(k) corresponding to the regions M1, M2 . . . Mk.

When the path becomes [YES] in step SA20, that is when the exposure frequency values are calculated for all the regions, it proceeds to step SA21. In step SA21, the area ratio based on standard width for region Mi is calculated according to the following formula (3);

$$Smi = n\_all(i)/\{(X \times Xr) \times (L2 \times Yr)\} \qquad (3)$$

where the denominator represents the total number of pixels in the region M1. Therefore, the parameter Smi (i=1 to k) represents the area ratio for the region Mi. When all the values of the area ratio are calculated, this subroutine is completed.

The above area ratios of the ink key divisions are recorded in a recording medium such as a floppy disk and magnetic card, and are entered into the printing control device, whereby the amount of ink supply is adjusted, and the correct amount of ink to correspond with the graphic area is supplied to the press.

Third Preferred Embodiment

A third preferred embodiment has many similar aspect to the foregoing first and second preferred embodiments, and explanations are not duplicated. This embodiment is a variation of the first embodiment and features the use of an externally supplied plate data FLD to operate the PAR computing device 16 of the first embodiment. The externally supplied FLD data contains information on the entire plate film layout of the printing plate P, and the standard width area ratios Srs are then calculated for a predetermined width, w (e.g. 0.05 mm), from the film exposure data ED. It is desirable that the standard width be sufficiently narrower than the ink key spacings of the printing press, and preferably a common divisor of the ink key spacings of various printing presses. However, any value which is an even multiple of the distance between the pixel dots of the exposure data ED can be utilized.

Next, is explanation of how to obtain the standard width area ratios Srs. In the PAR computing device 16, the entire film layout of the plate P, based on the plate data FLD and exposure data ED is contained in the memory as shown in FIG. 5. In this figure, the plate P is shown by a rectangular shape bounded by a solid line, and is divided into regions L1, L2 . . . Lk (where k represents the number of divisions within the plate P, and is calculated by a formula k=W(width of P)/w).

The PAR computing device 16 counts ON-OFF dots as [0] dots and [1] dots for each region, L1, L2 . . . Lk. For example, if Na1 represents the total number of [0], and Nb1 the total number of [1] in region L1, the standard with area ratio in region L1, Srs1, is obtained by computing a quantity $\{Nb1/(Na1+Nb1)\} \times 100$. By repeating this computation step for each of the regions L2, L3 . . . Lk, the area ratios Srs2, Srs3 . . . Srsk for the regions are obtained. A general formula for the area ratio is:

$$Srsi = \{Nbi/(Nai+Nbi)\} \times 100 \qquad (4)$$

where i is an integer, 1, 2, 3 . . . k.

Next, the standard width area ratios Srsi are stored as standard width area ratio data SS, which consist of plural bits, in a memory medium 17 such as a floppy disk or magnetic card. The recording medium 17 is connected to a data reading means (not shown) attached to the press. The data reading means reads off the values of the area ratio data SS, and based on its own particular spacing wi of the ink key division, and calculates the values of Sr for each of the ink key division. For example, if w is the width of the regions L1 to Lk of the standard width area, the area ratio corresponding to the first area ratio Sr1 is calculated from (Srs1+Srs2+Srsd)/d where d=wi/w. The area ratios Sr2, Sr3 for all other regions of the plates P are obtained in a similar way. The following is a general formula for calculating the area ratios of a given width;

$$Sri = (Srsj + Srs(j+1) + Srs\{i+1\}z(d-1)\})/d \qquad (5)$$

where i=1, 2, . . . W/wi, j=izd+1.

Based on the area ratios Sri, the data reading means controls the amount of ink supply to the press by adjusting the spacing and width of the ink key. The standard width area ratios data SS can be supplied directly to the press to convert the data SS to the area ratios Sri of a standard ink key spacing. The data SS can also be converted directly into ink key based area ratios and then this data can be sent on-line or off-line to the press.

The operation of the PAR computing device 16 will be explained.

The first step is to load into CTS 10 character and graphic information, CI and LI to perform printing plates layout. The CTS 10 outputs layout data LD to RIP 11, which converts the layout data LD into bitmap/character data BD and forwards the digitized data to a layout scanner 12. Layout scanner 12 scans a manuscript page and converting the photographic and figure images IM into 8-bit digital data, and arranges the placement of graphic data and bitmap/character data BD on a printing plate. This information is forwarded through a dot generator 13 and is supplied to the output scanner 14 and to the memory device 15 as film exposure data ED consisting of [0]s and [1]s. The output scanner 14 formulates a series of positive nettings films based on the successive incoming film exposure data ED. The nettings positive films are installed manually as illustrated in FIGS. 3 (a) and (b), for example, used in making printing plates as in the conventional technology. The plate layout information includes the nettings film exposure position and direction on the plate P, the dimension of the printing plate P, ink key spacings and the number of ink keys (i.e., the FLD information). This information is entered into the PAR computing device 16 through inputting means such as a keyboard. In the memory unit of the PAR device, this information is laid out, as shown in FIG. 5, to show the entire film layout on the plate P. Within each ink key division, the total numbers of [0] and [1] are counted, and the area ratios for the regions L1 to Lk are obtained according to the formula shown in (1). The area ratio data SS are recorded in memory means 17, with which data the printing press adjusts the amount of ink to be supplied, according to the particular width of the ink key division of the press, and according to the area ratio SS calculated according to the formula (2) above. This process assures the supply of correct volumes of various inks to the printing press in accordance with the relative proportions of various pictorial elements.

The area ratio data SS for all other plates P can be obtained similarly. In this third embodiment, bitmap/character data BD laid out on the basis of proof page can be entered directly into the memory medium 15. The area ratio data SS can be supplied to the press directly.

Fourth Preferred Embodiment

Figure 9:
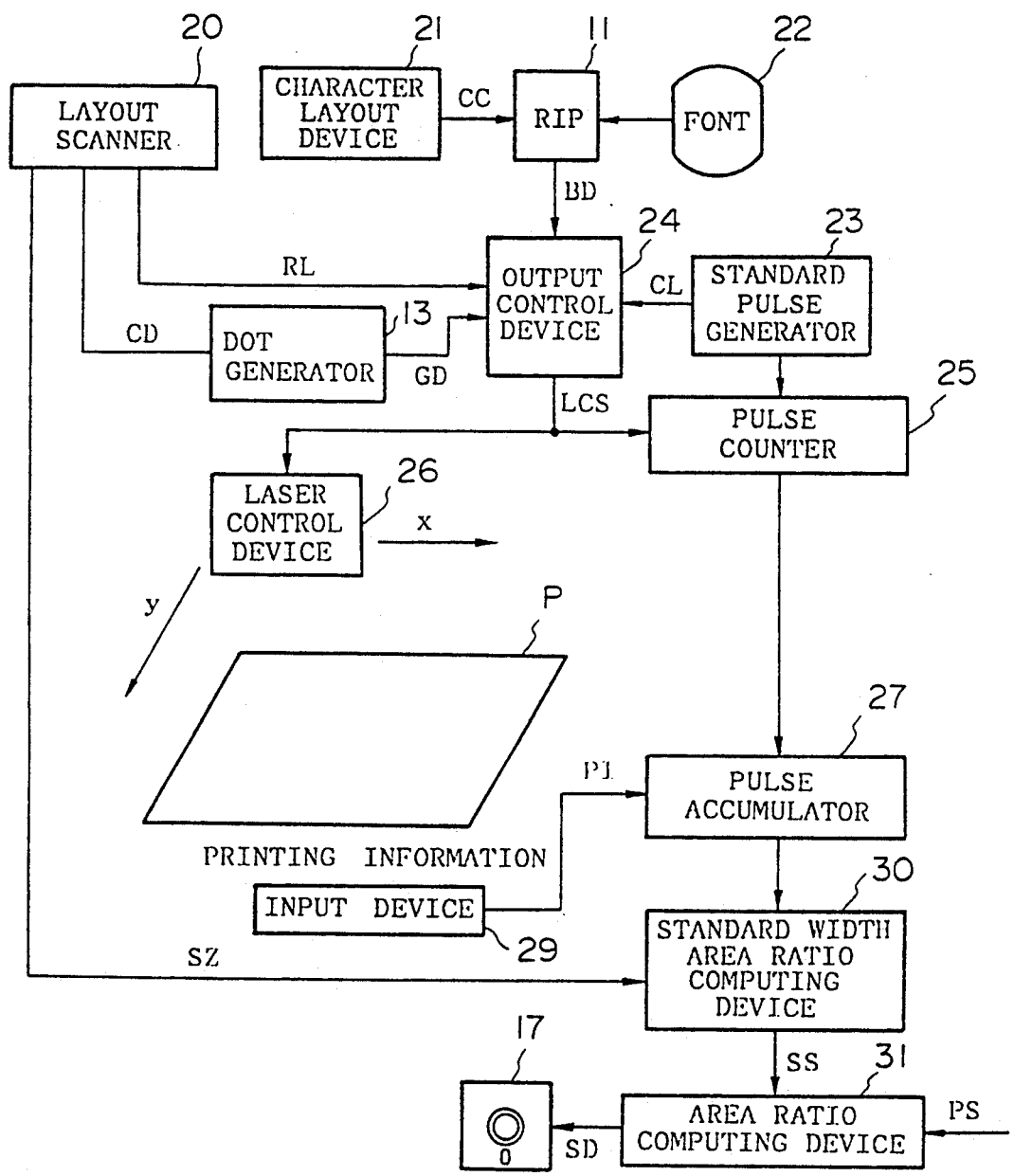
FIG. 9 is a block diagram of a fourth preferred embodiment.
Figure 10:
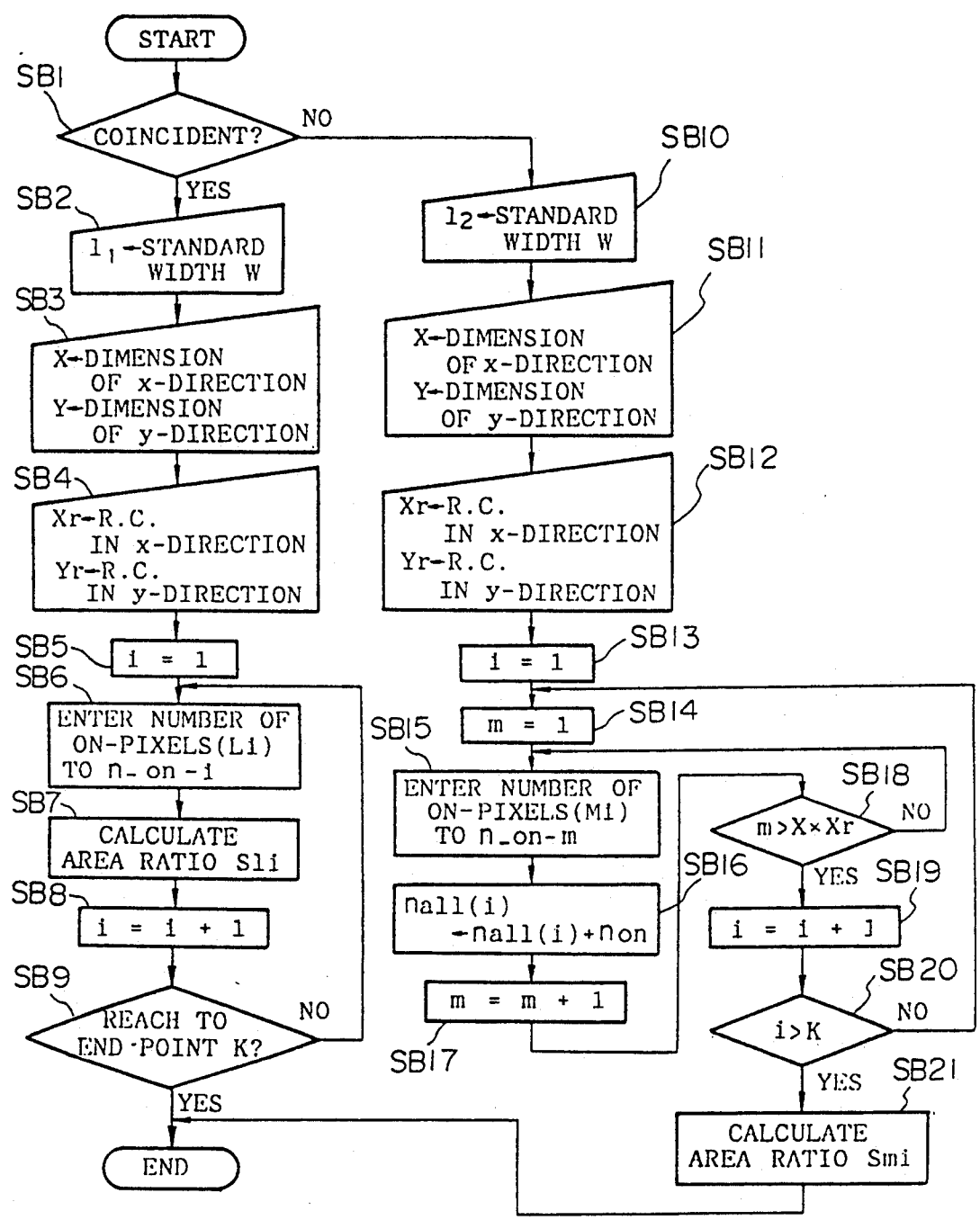
FIG. 10 is a flow chart showing the process steps in the fourth preferred embodiment.
Figure 11:
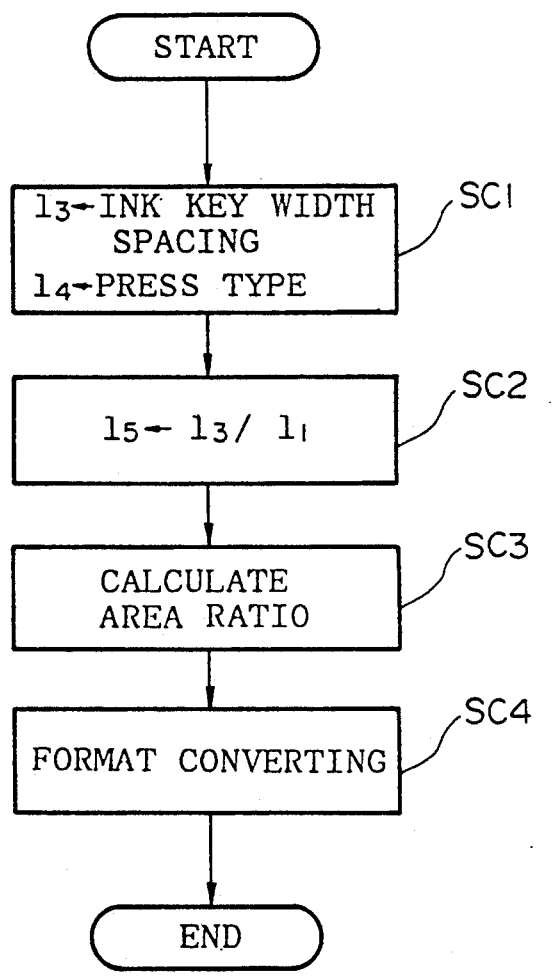
FIG. 11 is a flow chart showing the process steps in the fourth preferred embodiment.

The fourth embodiment is concerned with the application of the third embodiment for producing the plates layout directly on the plates, with reference to FIGS. 9, 10 and 11.

The features of this embodiment are as follows. In the second embodiment, the plate information PI, such as the size SZ of the plate P and the direction of printing, is supplied to the pulse count accumulator 27. A standard width area ratio (SWAR) computation device 30 is additionally included. This device calculates the SWAR Srs, based on the width of the ink key spacing which is less than the width of the press to be used according to the plate information PI, and enters the results as SWAR data SS into the area ratio computing device 31. The SWAR data SS is also stored in memory, and can be read out as needed. The area ratio computing device 31 has been supplied with information PS concerning the press, such as the width Wi of the ink key spacing and the type of press. The area ratio computing device 31 obtains the area ratios Sr, based on the above PI information and using the flow chart described later, for each ink key region, and outputs this information as area ratio data SS. This area ratio data SS is stored in a memory medium 17, such as a floppy disk or magnetic card. As was the case in the third embodiment, it can be arranged so that the SWAR data SS is supplied on-line or off-line to the area ratio computing device 31 of the press, and the SWAR area ratios are obtained at the press to correspond with the ink key spacings. If the area ratio computing means 31 is not installed on the press side, the area ratio data SS from the area ratio computing means 31 can be supplied on-line to the press as was the case in the third embodiment.

Next, the printing operation based on the above setup will be explained. The operations similar to those presented under the second embodiment will be deleted, and only the different features will be described here. The pulse count accumulator 27 sums the ON-pixels for a predetermined with w (0.05 mm for example) and forwards the information to the SWAR computing device 30. By following the flow chart shown in FIG. 10, SWAR computing device 30 computes the SWARs for characters and graphics in each region of the plate P. The standard width w referred to here should be much shorter than the with the ink key spacing, as was the case in the third preferred embodiment. Preferably, the dimension should be a common divisor of the spacings of ink keys of various printing presses. However, selection can be made so long as the width is an even multiple of the inter pixel distance. The flow chart program will now be explained.

First, in step SB1, it examines whether the printing direction and the exposure direction are coincident. If the result is [YES], i.e., the printing direction is the y-direction, program proceeds to step SB2. In step SB2, the value of the standard width w is entered into a parameter 11. In step SB3, the dimension for x-direction is entered into the parameter X, and that for y-direction in the parameter Y. In step SB4, the resolution capability in the y-direction is entered into the parameter Xr (which is the number of pixels per unit length in the x-direction), and that for the y-direction in the parameter Y. In step SB5, the parameter i is initialized, and in step SB6, within the region specified by i, in this case L1, the exposure frequency (ON-pixels) is entered into the parameter n_on-1. And proceeding into step SB7, the SWAR area ratios are obtained with the use of the formula (6) shown below:

$$Slsi = n\_on\text{-}i / \{(Y \times Yr) \times (L1 \times Xr)\} \tag{6}$$

where the denominator in the above equation is the total number of pixels in the area defined by the spacing L1. As a result, the parameter Slsi (i=1) produces the area ratio of the region L1.

Figure 8:
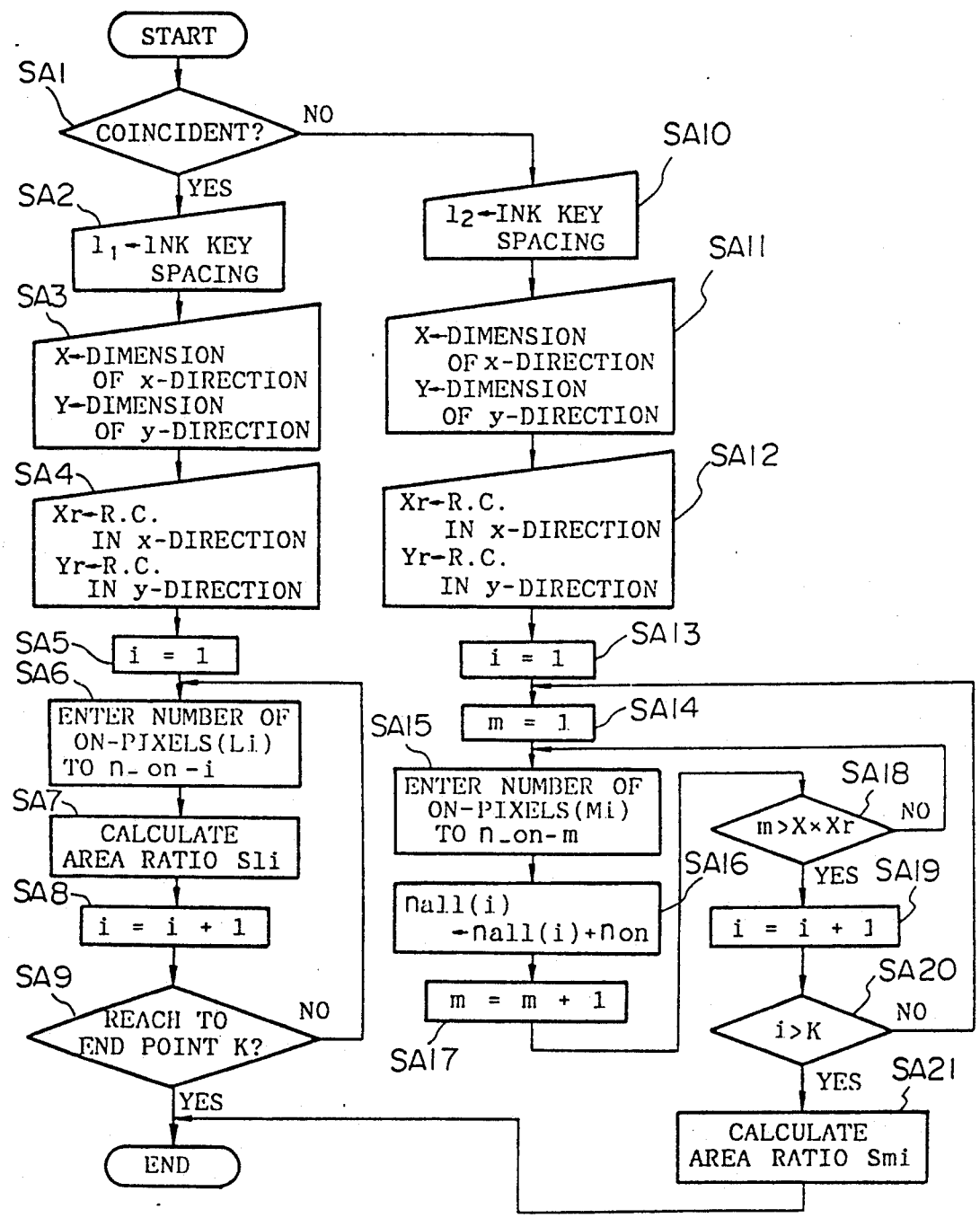
FIG. 8 is a flow chart showing the process steps in the second preferred embodiment.

The remaining steps SB6 to SB9 perform the same steps as the steps SA6 to SA9 which were shown in FIG. 8. Thus, the values for the SWAR Sls1, Sls2 . . . Slsk are obtained. When the result in step SB9 is [YES], i.e., all the SWAR values have been obtained, this subroutine is completed.

If the result in step SB1 is [NO], the path jumps to step SB10. The steps in step SB10 to SB 18 are the same as the steps in SA10 to SA18 which were shown in FIG. 8. That is, the steps SB15 to SB18 are repeated until the path in step SB18 becomes [YES], and a value of the exposure frequency parameter n_all(1) is obtained for the region M1. When the result in step SB18 is [YES], i.e., the exposure frequency in region M1 (FIG. 5) has been determined, then the control proceeds to step SB19, in which the parameter i is incremented to [2]. In step SB20, it examines whether the parameter is has exceeded the parameter k. If the result in step SB20 is [NO], it returns to step SB14, to repeat the steps SB14 to SB20 to obtain the exposure frequency in the region M2 to provide a value for the parameter n_all(2). These steps are repeated until the path becomes [YES] in step SB20, by incrementing i up to k. The result is the production of exposure frequency values for all the regions M1, M2 . . . Mk in the parameters n_all(1), n_all(2), . . . N_all(k).

When the result in step SB20 is [YES], i.e., all the values of the exposure frequency for the regions M1, M2, . . . Mk have been obtained, it proceeds to step SB21, in which the SWAR values for the region M1 is obtained with the formula (7) shown below:

$$Smsi = n\_all(i) / \{(X \times Xr) \times (L2 \times Yr)\} \tag{7}$$

where the denominator is the total number of pixels in the region M1, and the value of the area ratio for the region M1 is obtained in the parameter Smsi (i=1 to k). When all the regions are calculated, this subroutine is completed.

Next, the area ratio computing means 31 computes the area ratio data SS for the press to be used, by following the flow chart shown in FIG. 11, and on the basis of the SWAR data SS generated from the SWAR computing means 30. The computing steps are explained below.

In step SC1, the ink key width spacing wi and the press type are entered into the parameters 13 and 14, respectively. In step SC2, an average value of the ratio of the width spacing wi to that of the region is calculated, that is $l_3/l_1$ or $l_2$ from step SB, and entered into a parameter $l_5$. In step SC3, average values of the SWARs for the total number of regions stored in the parameter $l_5$ are calculated and are taken as area ratios Si for each of the ink key regions. In step SC4, area ratio data SS compatible with the format of the various presses, based on the information contained in the parameter $l_4$, are calculated.

The above area ratio data SS of the various regions are recorded in a recording medium such as a floppy disk magnetic card, and are entered into the printing control device, whereby the amount of ink supply is adjusted, and the correct amount of ink to correspond with the graphic area is supplied to the press.

Fifth Preferred Embodiment

Figure 12:
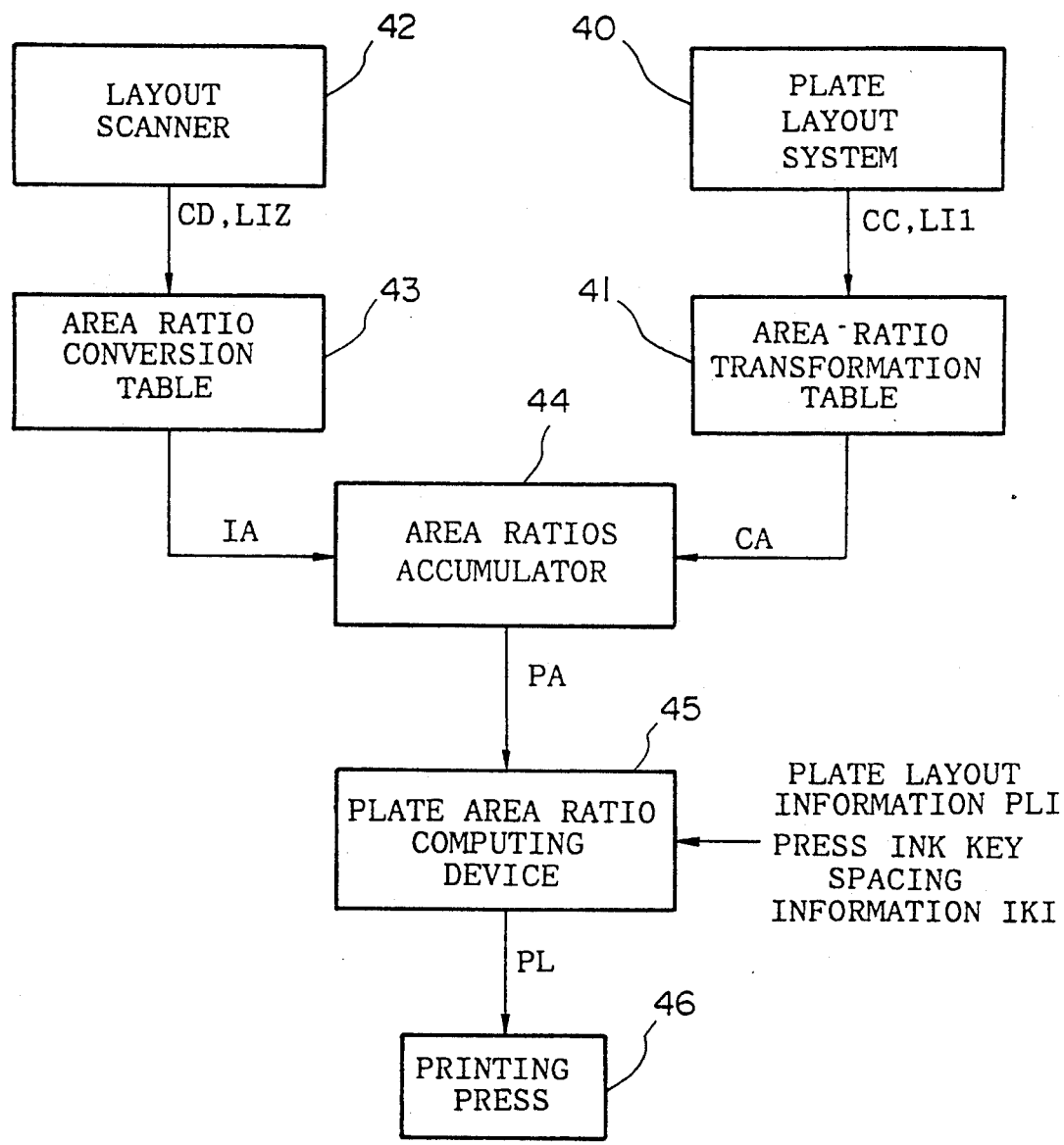
FIG. 12 is a block diagram of the fifth preferred embodiment.
Figure 13:
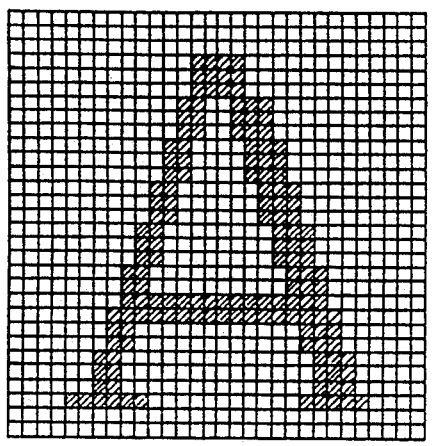
FIG. 13 is an illustration for explaining the details of obtaining the character area bitmap formation.

FIG. 12 is a block diagram of the fifth embodiment. In this arrangement, the plate layout system 40 lays out the character/graphic data per manuscript page entered by a keyboard. The plate information LI1 (font, letter size, word spacing, line spacing and others) and character code CC are supplied to the area ratio transformation table 41. The area ratio transformation table 41 computes the areas ratio for the characters CA contained In each region, based on the plate information LI1. An example of a method of obtaining the area ratio for the CA will be explained with reference to FIG. 13. In general, the practice for exposing the plate is to convert the character code CC into a bitmap data (font and data consisting of [0] or [1]) with the use of RIP (raster image processor) as shown, for example, in FIG. 13. The character is composed of a series of dots, which are exposed to the plate. Therefore, the character area ratio CA is determined beforehand by calculating the particular area ratio CA for the character, according to its font and letter size, and the data is stored in the table memory. Other characters and line/graphic information are treated similarly, and the table is therefore made of a series of predetermined area ratio data. When a character code CC is supplied to the area ratio conversion table 41, the table identifies the character from the table and obtains the corresponding area ratio CA for each of the regions concerned.

Figure 14A:
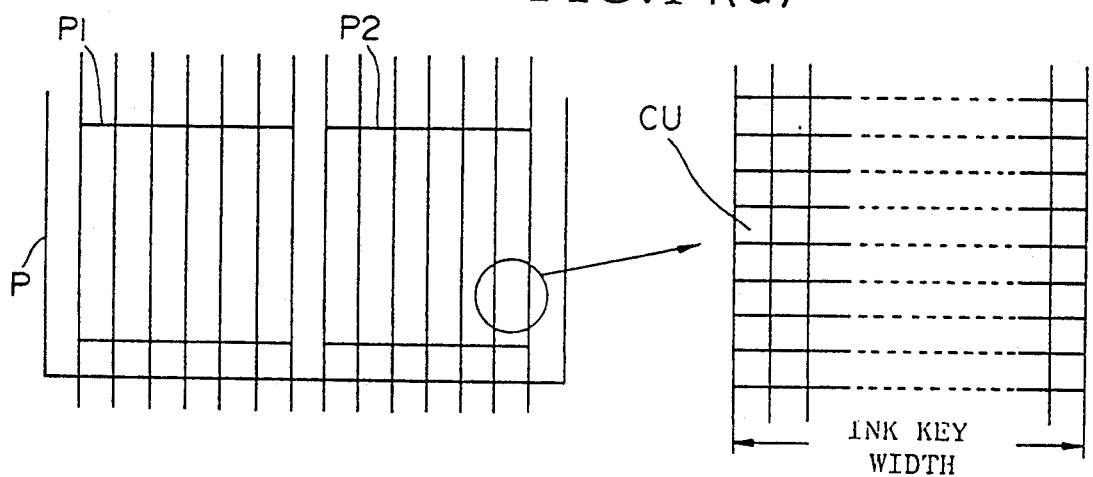
FIGS. 14 (a) and 14 (b) illustrate the concept of divisions involved in defining the character area ratio.
Figure 14B:
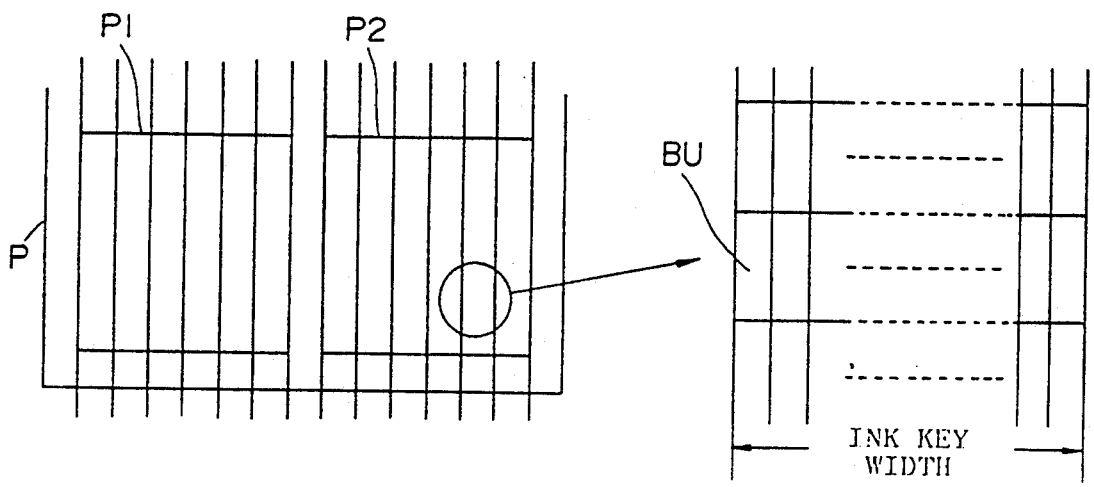

The setting of regional divisions is explained with reference to FIGS. 14 (a) and 14 (b). FIG. 14 (a) is an example of setting a region in terms of characters. Each page P1, P2 is divided into regions containing only a character, and therefore character area ratio CA is calculated on the basis of one character region CU. Next, FIG. 14 (b) is an example of setting a regional division BU on a basis of a band region having a given width, for example the width of an ink key spacing. Therefore, the pages P1 and P2, in this case, are divided into regional divisions BU containing several characters and characters having different letter sizes. For each of the regions BU, it is possible to obtain the total character area ratios (CA') contained in that particular regional division. The selection choice of regional division can be done on individual bases. The values of the character area ratio CA (or CA') are entered into a terminal of the area ratio accumulator 44 indicated in FIG. 12.

The layout scanner 42 shown in FIG. 12 scans pictures and graphics on the basis of a manuscript page and converts them into digital data (referred to as graphic data below) and determines how to lay out the data on each page of the plate. These picture and graphics are digitized at a dot density of between 100 to 300 dots per 1 mm × 1 mm square, in which each dot can be represented, for example, by an 8 bit contrast data CD. The contrast data CD together with layout information LI2 are supplied to the area ratio conversion table 43 shown in FIG. 12.

The area ratio conversion table 43 obtains area ratios of the various graphics contained in various regional division, as in the case of conversion table 41. The method of obtaining the area ratios will be explained in an example with reference to FIGS. 15 (a), 15 (b) and 15 (c). In general when exposing to the plate P, the contrast data CD is converted into nettings NP data having an area proportional to the tone of each dot. The nettings NP consists of pictorial elements PX made up of a multiple of dots, as shown in FIGS. 15 (a), 15 (b) and 15 (c). A bright dot is surrounded by a small dot area NPS while a dark dot is surrounded by a large dot area NPL. For example, a value of an eight-bit contrast data [127] corresponds to a pictorial element having nettings area of 50%. In other words, a pictorial element which represents a point of a picture, at which one half of the dots is exposed [ON] and the remaining half is not exposed [OFF]. Therefore, by determining the total number of dots within a nettings NP, the area ratio of a tone (referred to as the nettings area ratio IA below) can be determined beforehand, correlated with a contrast data CD and stored in the memory of table 43. Other contrast data can be treated in a similar manner, and stored in memory. When a contrast data CD is supplied to the area ratio conversion table 43, the table identifies the tone from the table and obtains the corresponding area ratio CA for each of the tones concerned to obtain the required area ratios for the various regional divisions, as described for the case of characters.

The setting of the pictorial regional divisions is performed in the same way as that for setting the division based on characters. The first method is set up in terms of a pictorial element, and the second method is set up in terms of a band having a given width or a length. The selection choice of the regional division can be made individually. The nettings area ratio IA (or band area ration IA') is entered into a terminal of the area ratios accumulator 44.

The area ratio accumulator 44 accumulates the area ratios per page by adding both the character area ratios CA and the nettings area ratios IA, for the various regions, and inputs the results into the PAR accumulating means 45. The area ratio accumulating means 45 is supplied with the information concerning the plate layout PLI and the press ink key spacing information IKI.

In this case the plate layout information PLI contains the same type of information as in the previous plate data FLD, such as the instruction for folding the printed object, page number, graphic patterns and the information, concerning the data location and the direction of printing the film on plate P consistent with the features of the press concerned. Further, the ink key spacing information IKI contains data concerning the spacings and the number of ink keys. The PAR computing means 45 computes the PAR data PL, according to the plate layout information PLI and the ink key spacing information IKI, for each page, for the various regional divisions according to ink key L1, L2, . . . Ln. In this case, n stands for the number of ink keys in the case of printing in the y-direction shown in FIG. 5 or for M1, M2, . . . Mn, if the printing direction is the y-direction. The results of the computations are supplied to the press 46.

The printing press 46 adjusts the ink amount for each plate according to the above plate area data PL to provide high quality printing.

The above mentioned steps for the PAR computing means 45 can also be made similar to those in the third and fourth preferred embodiments, whereby the division is based on ink key spacings which are sufficiently narrower than a standard with w (for example 0.05 mm), according to externally supplied plate layout data FLD. The area ratios are then calculated according to the various SWAR data Srs.

What is claimed is:

1. A method for calculating an area ratio between a graphic area comprising characters and graphics to be printed on at least one page by a printing plate, relative to a total area of the printing plate, the characters and graphics represented by character data and graphic data, respectively, said method comprising the steps of:
    arranging a first layout of the character data and the graphic data for each page, to generate first layout data;
    generating binary dot data by carrying out a bit-map-making-operation for said first layout data for each page;
    arranging a second layout of each page according to page layout information to produce plate-based data for the printing plate; and
    dividing the printing plate into specific regional divisions and counting said binary dot data for each specific regional division.

2. An area ratio computing apparatus for computing an area ratio between a graphic area comprising characters and graphics to be printed on at least one page by a printing plate in a printing press, relative to a total area of the printing plate, the characters and graphics represented by character data and graphics data, respectively, said apparatus comprising:
    first layout means for arranging the character data and the graphic data for each page, to generate first layout data;
    data conversion means for carrying out a bit map making operation on said first layout data for each page, to generate binary dot data;
    second layout means for arranging each page on the printing plate;
    counting means for dividing the printing plate into specified regional divisions and counting said binary dot data for each specified regional division, to generate regionally divided counting data;
    computing means for computing a total relative area of graphic data based upon the regionally divided counting data.

3. An area ratio computing apparatus for computing an area ratio between a graphic area comprising characters and graphics to be printed on at least one page by a printing plate in a printing press, relative to a total area of the printing plate, the characters and graphics represented by character data and graphics data, respectively, said apparatus comprising:
    counting means for temporarily storing the graphic data as digitized graphic information which is used to print the graphic data directly on the printing plate, dividing the printing plate into regionally divided blocks and counting the digitized graphic information for each regionally divided block; and
    computing means for computing area ratios for each regional block based on the output information from the counting means corresponding to said regional blocks.

4. A method for calculating an area ratio between a graphic area comprising characters and graphics to be printed on at least one page by a printing plate in a printing press, relative to a total area of the printing plate, the characters and graphics represented by character data and graphic data, respectively, said method comprising the steps of:
    arranging a first layout of the character data and the graphic data for each page, to generate first layout data;
    generating binary dot data by carrying out a bit map making operation for said first layout data for each page;
    arranging a second layout of each page according to page layout information to produce plate-based data for the printing plate; and
    dividing the printing plate into regional area divisions, each regional area division having a width not more than a width of an ink key of the printing press, and counting the binary bit data for each regional area division.

5. The method according to claim 4, wherein said regional area divisions divide the printing plate into a parallel band of block areas.

6. The method according to claim 4, wherein said area ratio is computed between the width of the ink key of the printing press relative to a standard area ratio of a specified width.

7. An area ratio computing apparatus for computing an area ratio between a graphic area comprising characters and graphics to be printed on at least one page by a printing plate in a printing press, relative to a total area of the printing plate, the characters and graphics represented by character data and graphics data, respectively, said apparatus comprising:
    first layout means for arranging the character data and the graphic data for each page, to generate first layout data;
    data conversion means for carrying out a bit map making operation on said first layout data for each page, to generate binary dot data;
    second layout means for arranging each page on the printing plate;
    counting means for dividing the printing plate into regional area divisions, each regional area division having a width not more than a width of an ink key of the printing press and counting said binary dot data; and
    computing means for computing an area of the graphic data relative to a standard width of the ink keys based upon said counted binary dot data.

8. An apparatus for computing an area ratio for a graphic area comprising characters and graphics to be printed on at least one page by a printing plate in a printing press, relative to a total area of the printing plate, the characters and graphics represented by character data and graphics data, respectively, said apparatus comprising:
    conversion means for converting the graphic data into exposure related binary data;
    exposing means for exposing the graphic data directly on the printing plate by using the exposure related binary data, counting means for counting the exposure related binary data divided into regional blocks corresponding to areas of the printing plate, each regional block having a width not more than a width of the printing press; and computing means for computing the area ratio of graphic area, for each regional block, based on the output information from the results of the counting means.

9. The apparatus according to claim 8, wherein said regional blocks correspond to said printing plate being divided into a parallel band of block areas.

10. The apparatus according to claim 7, wherein said area ratio is computed between the width of the ink key of the printing press relative to a standard area ratio of a specified width.

11. A method for computing a plate area ratio between a graphic area comprising characters and graphics to be printed on at least one page by a printing plate, relative to a total area of the printing plate, the characters and graphics represented by character data and graphic data, respectively, said method comprising the steps of:

arranging a first layout of the character data and graphic data for each page, including a step of obtaining character area ratio information of the character data having particular fonts, from first memory means which stores a plurality of area ratio information respectively corresponding to a variety of font formats;

determining graphic area ratios for the graphic data obtained from graphic data area ratio information in a second memory means which stores the graphic data area ratio information based on image nettings having predetermined area data; and dividing the print plate into regional divisions and determining the plate area ratio of the character data and the graphic data from said character area ratio information and said image nettings, according to a layout of the printing plate and according to said regional divisions.

12. An area ratio computation apparatus for computing a plate area ratio between a graphic area comprising characters and graphics to be printed on at least one page by a printing plate, relative to a total area of the printing plate, the characters and graphics represented by character data and graphics data, respectively, said apparatus comprising:

layout means for arranging the character data and the graphic data for each page;

first memory means for storing a plurality of area ratios for character data having respectively corresponding fonts; and second memory means which stores graphic area ratio information based on image nettings having predetermined area data;

area ratio accumulating means for obtaining a sum of the area ratios of the character data to be printed from the first memory means and the image nettings from the second memory means; and computing means for dividing the printing plate into regional divisions and computing the plate area ratio based on the output data from said accumulating means according to a layout of the printing plate and said regional divisions.

* * * * *

UNITED STATES PATENT AND TRADEMARK OFFICE
CERTIFICATE OF CORRECTION

PATENT NO. : 5,335,315
DATED : August 2, 1994
INVENTOR(S) : Masakichi Yoshida et al.

It is certified that error appears in the above-indentified patent and that said Letters Patent is hereby corrected as shown below:

Figure 5 of the drawings, "Mk" should be --Lk--;
"$M_3$" should be --$L_3$--;
"$M_2$" should be --$L_2$--;
"$M_1$" should be --$L_1$--;

Col. 1, line 18, "plates" should be --plate--.
Col. 2, line 5, between "enable" and "determination" insert --the--.
Col. 11, line 7, delete "(FIG. 5)"; and
line 45, after "e.g." insert a --,--.
Col. 14, line 2, after the "," (first occurrence) insert --the--.
Col. 15, line 13, after "disk" insert --or--.
Col. 16, line 4, delete "by".

Signed and Sealed this

Twenty-third Day of May, 1995

BRUCE LEHMAN

*Attest:*

*Attesting Officer*  *Commissioner of Patents and Trademarks*

UNITED STATES PATENT AND TRADEMARK OFFICE
CERTIFICATE OF CORRECTION

PATENT NO. : 5,335,315
DATED : August 2, 1994
INVENTOR(S) : Masakichi YOSHIDA et al.

It is certified that error appears in the above-indentified patent and that said Letters Patent is hereby corrected as shown below:

Figure 5 of the drawings, "Mk" should be --Mk--;

"$M_3$" should be --$M_3$--;

"$M_2$" should be --$M_2$--;

"$M_1$" should be --$M_1$--.

Signed and Sealed this

Second Day of April, 1996

Attest:

BRUCE LEHMAN

*Attesting Officer*     *Commissioner of Patents and Trademarks*